United States Patent
Evertsz et al.

(10) Patent No.: US 7,562,039 B2
(45) Date of Patent: Jul. 14, 2009

(54) METHOD AND COMPUTER SYSTEM FOR COMPUTING AND DISPLAYING A PHASE SPACE

(75) Inventors: Carl J. G. Evertsz, Bremen (DE); Wilhelm Berghorn, Bremen (DE)

(73) Assignee: Mevis Technology GmbH, Bremen (DE)

(*) Notice: Subject to any disclaimer, the term of this patent is extended or adjusted under 35 U.S.C. 154(b) by 1291 days.

(21) Appl. No.: 09/870,387

(22) Filed: May 29, 2001

(65) Prior Publication Data

US 2002/0165810 A1 Nov. 7, 2002

(30) Foreign Application Priority Data

Mar. 14, 2001 (EP) ................................. 01106226

(51) Int. Cl.
*G06Q 40/00* (2006.01)
(52) U.S. Cl. .................... 705/36 R; 705/35; 705/37
(58) Field of Classification Search ............... 345/440; 705/35–37; 709/224; 708/313
See application file for complete search history.

(56) References Cited

U.S. PATENT DOCUMENTS

| | | | |
|---|---|---|---|
| 5,347,452 A * | 9/1994 | Bay, Jr. ........................ | 705/37 |
| 5,664,106 A * | 9/1997 | Caccavale ................... | 709/224 |
| 6,012,044 A | 1/2000 | Maggioncalda et al. | |
| 6,020,898 A * | 2/2000 | Saito et al. .................. | 345/440 |
| 6,023,280 A * | 2/2000 | Becker et al. ............... | 345/440 |
| 6,066,454 A * | 5/2000 | Lipshutz et al. ............. | 506/8 |
| 6,195,103 B1* | 2/2001 | Stewart ...................... | 345/440 |
| 6,477,553 B1* | 11/2002 | Druck ........................ | 708/313 |
| 7,072,863 B1* | 7/2006 | Phillips et al. ............. | 705/36 R |
| 7,133,568 B2* | 11/2006 | Nikitin et al. .............. | 382/260 |
| 7,219,032 B2* | 5/2007 | Spiesberger ................ | 702/150 |
| 7,242,808 B2* | 7/2007 | Nikitin et al. .............. | 382/210 |
| 7,363,191 B2* | 4/2008 | Spiesberger ................ | 702/142 |
| 7,392,211 B2* | 6/2008 | Shlafman et al. ........... | 705/35 |
| 7,415,433 B2* | 8/2008 | Huneault ................... | 705/36 R |
| 2003/0065409 A1* | 4/2003 | Raeth et al. ................. | 700/31 |
| 2007/0198387 A1* | 8/2007 | Uenohara et al. .......... | 705/36 R |
| 2008/0294371 A1* | 11/2008 | Chandler ................... | 702/179 |

FOREIGN PATENT DOCUMENTS

GB EP 0030720 A2 * 6/1981

* cited by examiner

*Primary Examiner*—Narayanswamy Subramanian
(74) *Attorney, Agent, or Firm*—Martin Fleit; Paul D. Bianco; Fleit Gibbons Gutman Bongini & Bianco PL

(57) ABSTRACT

A method and a computer system for computing and displaying a phase space relating the performance of a variable to its volatility in an intuitive and interactive way. The method and system enables a comparison of the performances of different stock values and the development of the performance over time. Further, a sub-space of the phase space is determined corresponding to a certain probability threshold of the variables considered.

20 Claims, 9 Drawing Sheets

METHOD AND COMPUTER SYSTEM FOR COMPUTING AND DISPLAYING A PHASE SPACE

FIELD OF THE INVENTION

The invention relates a method and computer system for computing and displaying a phase space, and more particularly, a method and computer system for the analysis and visualization of data, in particular with respect to financial data, such as stock market data.

BACKGROUND AND PRIOR ART

From U.S. Pat. No. 6,012,044 a user interface for a financial advisory system is known. The financial advisory system includes a graphical input mechanism for calibration of a desired level of investment risk. A set of available financial products, such as a set of mutual funds, and a predefined volatility, such as the volatility of the Market Portfolio are received. The settings associated with the graphical input mechanism are constrained based upon the set of available financial products. Additionally, the calibration of the units of the graphical input mechanism may be expressed as a relationship between the volatility associated with a setting of a graphical input mechanism and the predefined volatility.

The volatility or standard deviation is an important measure for the analysis of a sequence of data samples. The concept of volatility is used in virtually all fields of science and technology for the analysis of data being representative of a real world physical, medical, sociological or financial variable or entity. The volatility is used as a measure for the degree of variability of such data samples. A variable that fluctuates widely over time has a high volatility. One that is stable has low volatility.

The standard definition for volatility as used in finance is: the volatility of a random variable is the standard deviation of its return. In practice, volatilities are calculated for such variables as the market value of a Portfolio, interest rates, stock prices, exchange rates, etc., and are essential for option pricing.

A common disadvantage of the prior art is that the development of a variable as reflected by a corresponding sequence of data samples cannot be related to the volatility of the sequence of data samples in a meaningful way, especially if more than one variable is to be considered at the same time. In the case of stock market data, the comparison of the stock performance for an investment period, of—say—a month, cannot be compared and valuated to the annualized volatility in a meaningful and intuitive way in prior art systems.

SUMMARY OF THE INVENTION

It is therefore an object of the invention to provide an improved method and computer system for computing and displaying a point and/or a curve in a phase space relating the development of an observed variable to its volatility.

The invention is advantageous in that it enables valuation of the volatility versus the development of the observed variable over a specific period. In the case of financial data this enables relating the return to the volatility, such as for the comparison of the characteristics and performance of financial and stock market values.

According to a preferred embodiment the relation of the return and the volatility is displayed in a phase space. In addition, a sub-space in the phase space can be displayed for highlighting an area in which the observed variable is to be expected with a certain probability.

In the case of a fixed probability distribution with varying width (such as the Gaussian probability distribution) for the differences of consecutive data samples in the analyzed sequence, this results in a cone-like shape of the sub-space.

Further the invention enables computation of a curve in the phase space. The points of the curve are calculated based on consecutive sub-sequences of the sequence of data samples. In the case of stock market data, a logarithmic grid is preferably used for determining the sub-sequences.

This is of particular advantage for stock market data. For many stock values the volatility scales as the square root of time. This is compensated for by the logarithmic grid.

According to a further preferred embodiment the curve is shown in an animated mode. For this purpose a sequence of frames is generated. Each frame shows a sub-set of the points of the complete curve belonging to a corresponding sub-sequence of the sampled data. By displaying the frames sequentially the development of the curve over time is shown. This way the development of the observed variable in relation to its volatility is visualized to a user.

According to a further aspect of the invention a database is generated for storing of sequences of data samples for later analysis. The database is organized by means of a hierarchical tree structure.

Each leaf of the tree has at least one directory for storing at least one sequence of data samples. In this way, a required data sample can directly be accessed using an index corresponding to the hierarchical tree structure.

In the case of stock market data the database can be updated permanently by feeding stock market data into the database in real time. Preferably, each of the incoming data samples has a time stamp provided by a so-called hardware tick. This way the data samples are ordered in a time series.

Preferably, the database is stored on a server computer that can be accessed from a client computer over a computer network, such as the Internet.

In a further preferred embodiment a program being resident on a client computer is used for calculation of the points in the phase space and/or the curve in the phase space and for display. Alternatively, an applet, such as a Java Applet, is used for loading the required data samples into the client computer and performing the required calculations.

The latency time of the client access to the server is minimized by the design of the database. The database allows direct access to the required sequences of data samples. This way the required computing power of the server computer is kept to a minimum as the data processing is essentially done by the client computer; the server computer's role can essentially be reduced to the database generation and database update.

The invention is particularly advantageous in that it enables performing update operations with minimal latency times. The client computer can query the server computer at regular intervals to obtain the newest stock market data.

For performing a corresponding query the client computer provides the server computer with the time stamp of the latest data sample of the considered sequence obtained when it was initially downloaded or updated the last time. This time stamp serves as an entry key into the corresponding directory, which can therefore be checked in a very efficient way for additional data, which have been provided in the meantime by the data transfer from the stock market computer system.

Furthermore, frequently requested datasets such as portfolios, e.g. index portfolios, are precalculated and stored on the server. Again the client computer provides the server computer with the time stamp and an access code of the latest data sample of the considered portfolio for requesting a transmission of additional data to the client.

In a further preferred embodiment the client computer is recognized by a cookie or a login process and the individual portfolio corresponding to the cookie information or the login signature is precalculated by the server, stored on the server and regularly updated by a background server process for minimizing the overall server requests. The life-time of the client process requesting the portfolio data is measured by monitoring the connection. If the client stops requesting additional data, the background process is stopped after a predetermined time interval.

BRIEF DESCRIPTION OF THE DRAWINGS

In the following, a preferred embodiment of the invention is described with respect to the drawings in which.

DETAILED DESCRIPTION OF PREFERRED EMBODIMENTS

Glossary of Terms and Acronyms

Figure 1:
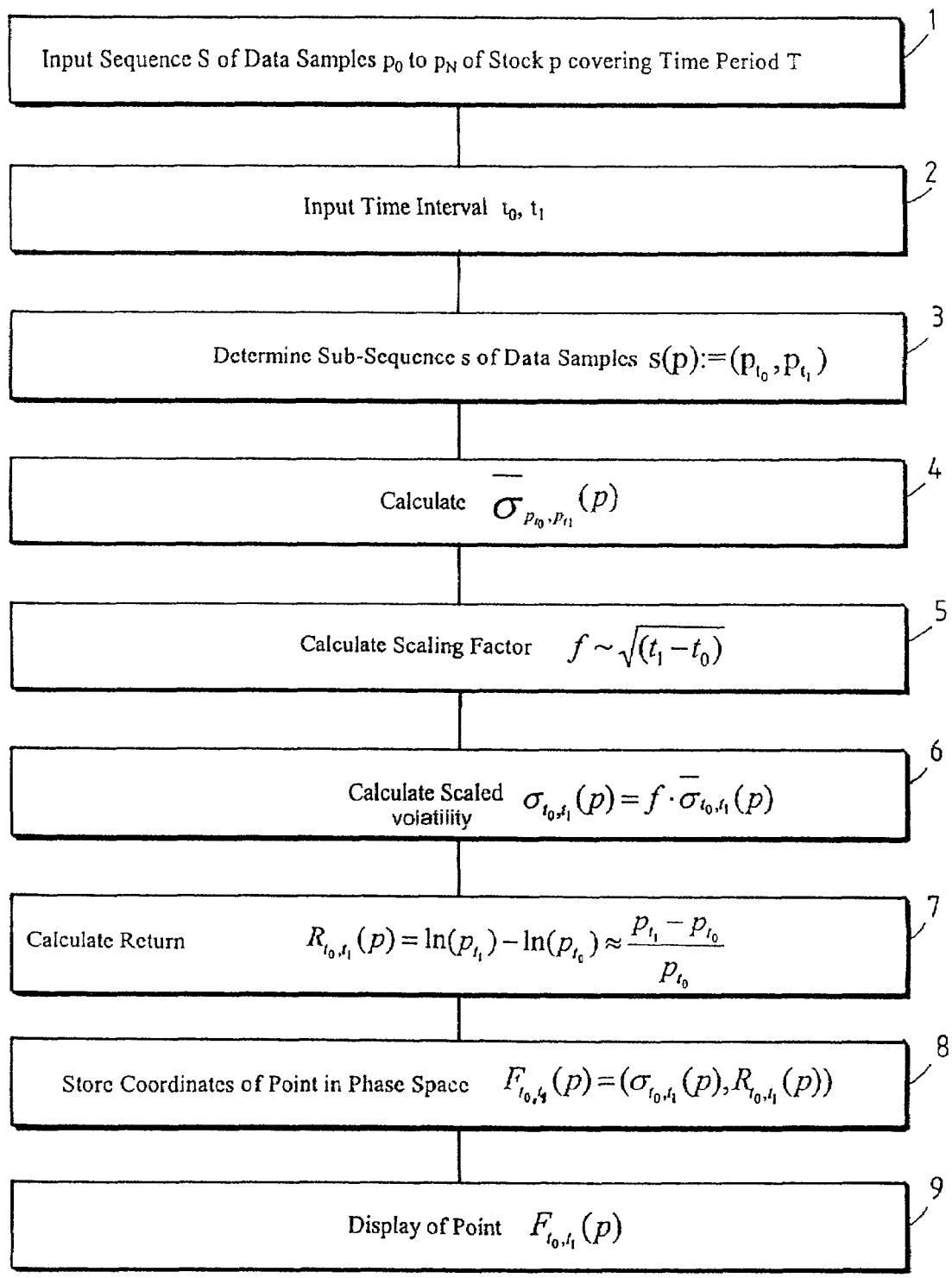
FIG. 1 is a flow chart for calculating the coordinates of a point in a phase space.

The following terms and acronyms are used throughout the detailed description:

Client-Server. A model of interaction in a distributed system in which a program at one site sends a request to a program at another site and waits for a response. The requesting program is called the "client", and the program that responds to the request is called the "server". In the context of the World Wide Web (discussed below), the client is a "Web browser" (or simply "browser") that runs on a computer of a user; the program which responds to browser requests by serving Web pages is commonly referred to as a "Web server".

Hyperlink. A navigational link from one document to another, or from one portion (or component) of a document to another. Typically, a hyperlink is displayed as a high-lighted word or phrase that can be selected by clicking on it using a mouse to jump to the associated document or documented portion.

Hypertext System. A computer-based informational system in which documents (and possibly other types of data entities) are linked together via hyperlinks to form a user-navigable "web".

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols).

World Wide Web ("Web"). Used herein to refer generally to both (i) a distributed collection of interlinked, user viewable hypertext documents (commonly referred to as Web documents or Web pages) that are accessible via the Internet, and (ii) the client and server software components that provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

Web Site. A computer system that serves informational content over a network using the standard protocols of the World Wide Web. Typically, a Web site corresponds to a particular Internet domain name, such as "IBM.com", and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (Hyper Text Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from Web server to a browser, the codes are interpreted by the browser and used to parse and display the document. Additionally, in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc. 1995 (ISBN 0471-11894-4).

HTTP (Hyper Text Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document of file located at the specified URL.

JAVA. A portable language for building of highly distributable applications or applets. An applet can be accessed over the Internet. It is self-contained in that it carries its' own presentation and processing code and can run on whatever type of computer which imports it. Applets are being used as "plug-in" units that form part of a larger application.

URL (Uniform Resource Locator). A unique address which fully specifies the location of a file or other resource on the Internet. The general format of a URL is protocol://machine address:port/path/filename. The port specification is optional, and if none is entered by the user, the browser defaults to the standard port for whatever service is specified as the protocol.

Cookies. A technology that enables a Web server to retrieve information from a user's computer that reveals prior browsing activities of the user. The informational item stored on the user's computer (typically on the hard drive) is commonly referred to as a "cookie". Many standard Web browsers support the use of cookies.

PUSH Technology. An information dissemination technology used to send data to users over a network. In contrast to the World Wide Web (a "pull" technology), in which the client browser must request a Web page before it is sent, PUSH protocols send the informational content to the user computer automatically, typically based on information specified in advance by the user.

FIG. 1 shows a flow chart for computing a point in a phase space in accordance with a preferred embodiment of the invention. In step 1 a sequence S of data samples $P_0$ to $P_N$ is inputted. In the example considered here the data samples belong to a stock p and cover a period T.

For example the data samples can be representative of price fixings, such as the daily settlement prices and/or intra-day price fixings, depending on the length of the time period T considered.

The data samples can also be representative of other financial variables, such as the prices of stock options, bonds, currency exchange rates or other micro or macro economical variables, such as turnover, return on net asset, inflation rate or unemployment.

Further, the invention is not restricted to the field of finance and economics, but is also applicable to all different kinds of data. For example the invention can be applied for the analysis and visualization of data samples from the fields of sociology, such as data from opinion polls, or even for comparison of the relative performance of football-teams.

Furthermore, the invention is not restricted to data samples covering a specific period of time. Especially for data samples obtained from the fields of physical experiments and technology, the series of the data samples can also span other dimensions like length, energy or speed.

However, for illustrative purposes the preferred embodiment of FIG. 1 is explained in greater detail with respect to data samples of an arbitrary stock p.

In step 2 the time interval of the time period T between $t_0$ and $t_1$ is inputted to specify the sub-sequence s of the data samples to be analyzed. This sub-sequence $s(p):=(p_{t_0}, \ldots, p_{t_1})$ is determined in step 3 by limiting the input sequence S to data samples corresponding to the time interval as specified in step 2.

In step 4 the volatility is calculated in accordance with the following formula:

$$\overline{\sigma_{t_0,t_1}(p)} = \frac{1}{\sqrt{t_1 - t_0 - 1}} \sqrt{\sum_{t=t_0}^{t_1-1} (\overline{R_{t_0,t_1}(p)} - R_{t,t+1}(p))^2} \quad (1)$$

where $R_{t,t+1}(p)$ is expressive of the difference of two consecutive data samples $P_t$ and $P_{t+1}$, i.e.

$$R_{t,t+1}(p) = \ln(p_{t+1}) - \ln(p_t) \approx \frac{p_{t+1} - p_t}{p_t} \quad (2)$$

and

-continued $$\overline{R_{t_0,t_1}(p)} = \frac{1}{t_1 - t_0} \sum_{t=t_0}^{t_1-1} \ln(p_{t+1}) - \ln(p_t) \quad (3)$$

In the case of stock prices considered here $R_{t_0,t_1}(p)$ denotes the log-return over a variable time interval $t_0$, $t_1$, where $t_0 < t_1$ and where p denotes the sequence s of settlement prices of the considered stock. For example the time interval $t_0$, $t_1$ can be 1 day, 1 month, 15s or any other arbitrarily chosen time interval. Also, the volatility (Equation 1) can be multiplied with 100% to yield "percentage volatility".

In step 5 a scaling factor f is determined. The scaling factor is chosen to be a mathematical function of the length of the sub-sequence s to be analyzed. In the example considered here the factor f is chosen in accordance with the following formula $$f = \sqrt{(t_1 - t_0)} \quad (4)$$

In the next step 6 the volatility as determined in accordance with above formula (1) is scaled with the factor f:

$$\sigma_{t_0,t_1}(p) = f \cdot \overline{\sigma}_{t_0,t_1}(p) \quad (5)$$

The scaling of the volatility with the factor f is important for generating a visualization of the result of the analysis that is intuitive and allows to objectively compare the relative performances of different stocks over varying time periods.

In the next step 7 the return of the stock p is calculated over the considered time interval between $t_0$ and $t_1$ in accordance with above formula (2). This way two coordinate values of a point in the phase space representing the performance of the stock over the observed time interval are determined. In the case of a Cartesian coordinate system the coordinates of this point $F_{t_0,t_1}(p)$ are as follows:

$$F_{t_0,t_1}(p) = (\sigma_{t_0,t_1}(p), R_{t_0,t_1}(p)) \quad (6)$$

In step 9 a Cartesian coordinate system is displayed. The x-axis of the coordinate system is representative of the scaled volatility and the y-axis is representative of the return $R_{t_0,t_1}(p)$. The point $F_{t_0,t_1}(p)$ is displayed in this coordinate system.

The above-described sequence of steps 1 to 9 can be performed with respect to a variety of different stocks, such as the stocks contained in a stock index, for example the DAX, NEMAX, SMAX, NASDAQ or DOW or for a personal portfolio of stocks. In this case, each of the stocks considered is represented by a corresponding point $F_{t_0,t_1}(p)$ in the phase space. This will be explained in greater detail with respect to FIGS. 3 and 5.

Figure 2:
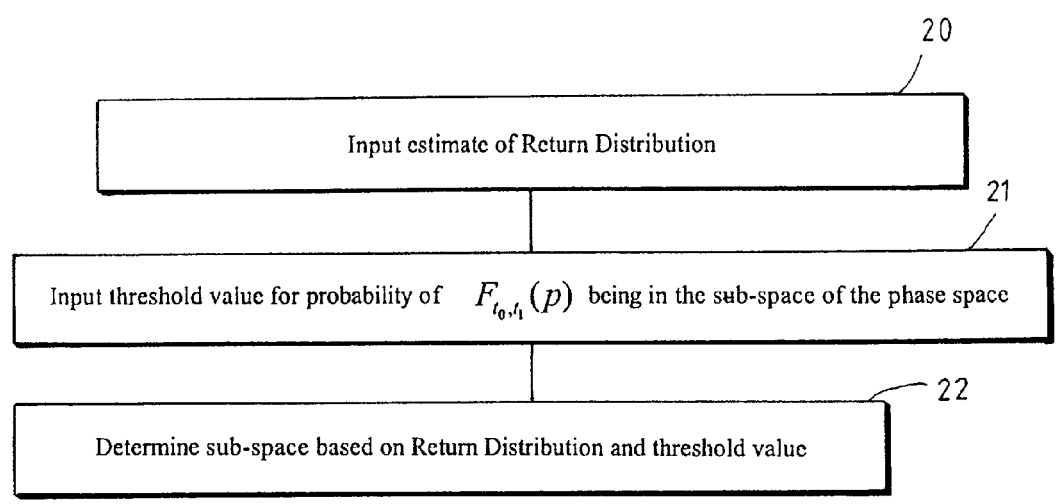
FIG. 2 is a flow chart for calculating a sub-space of the phase space in which the observed variable is situated with a certain probability.

FIG. 2 shows a flow chart for determining a sub-space in the phase space. The sub-space delimits an area in the phase space in which a point $F_{t_0,t_1}(p)$ is situated with a given probability. Due to the uniform scaling of the volatility in step 6 of FIG. 1, and the assumption that the probability distributions are the same, the sub-space of the phase space is the same for all stocks considered over the time interval $t_0$ to $t_1$ (cf. step 2 of FIG. 1).

The sub-space is determined as follows:

In step 20 an estimation of the statistical return distribution of the returns $R_{t_0,t_1}(p)$ of the samples $s(p):=(p_{t_0}, \ldots, p_{t_1})$ is provided.

In step 21 a threshold value for the probability is inputted. The threshold value defines the probability of the point $F_{t_0,t_1}(p)$ of a considered stock being located within the sub-space.

In step 22 the sub-space is determined based on the return distribution and the probability threshold value as inputted in steps 20 and 21, respectively.

For example, the return distribution can be assumed to be a Gaussian distribution and the threshold value for the probability can be chosen to be equal to 68,27% for all stocks to be considered. In this case the delimitation of the sub-space is given by the relation $$x > |y| \quad (7)$$

where x denotes the return in percent and y denotes the volatility estimate in percent.

In this case a point $F_{t_0,t_1}(p)$ is located in the sub-space with a probability of 68,27%, when the absolute value of the return is less than $\sigma_{t_0,t_1}(p) \times 100\%$.

In case the probability threshold is chosen to be equal to the probability of a 2-Sigma event, Prob $(|R_{t_0,t_1}(p)| < 2*\sigma_{t_0,t_1}(p))$, the corresponding resulting probability of a point $F_{t_0,t_1}(p)$ being in the sub-space is about 10% and in the case of a 3-Sigma event, i.e. Prob $(|R_{t_0,t_1}(p)| < 3*\sigma_{t_0,t_1}(p))$ the resulting probability is about 1%. The corresponding delimitations of the corresponding sub-spaces is then given by x>2|y| and x>3|y|, respectively.

Figure 3:
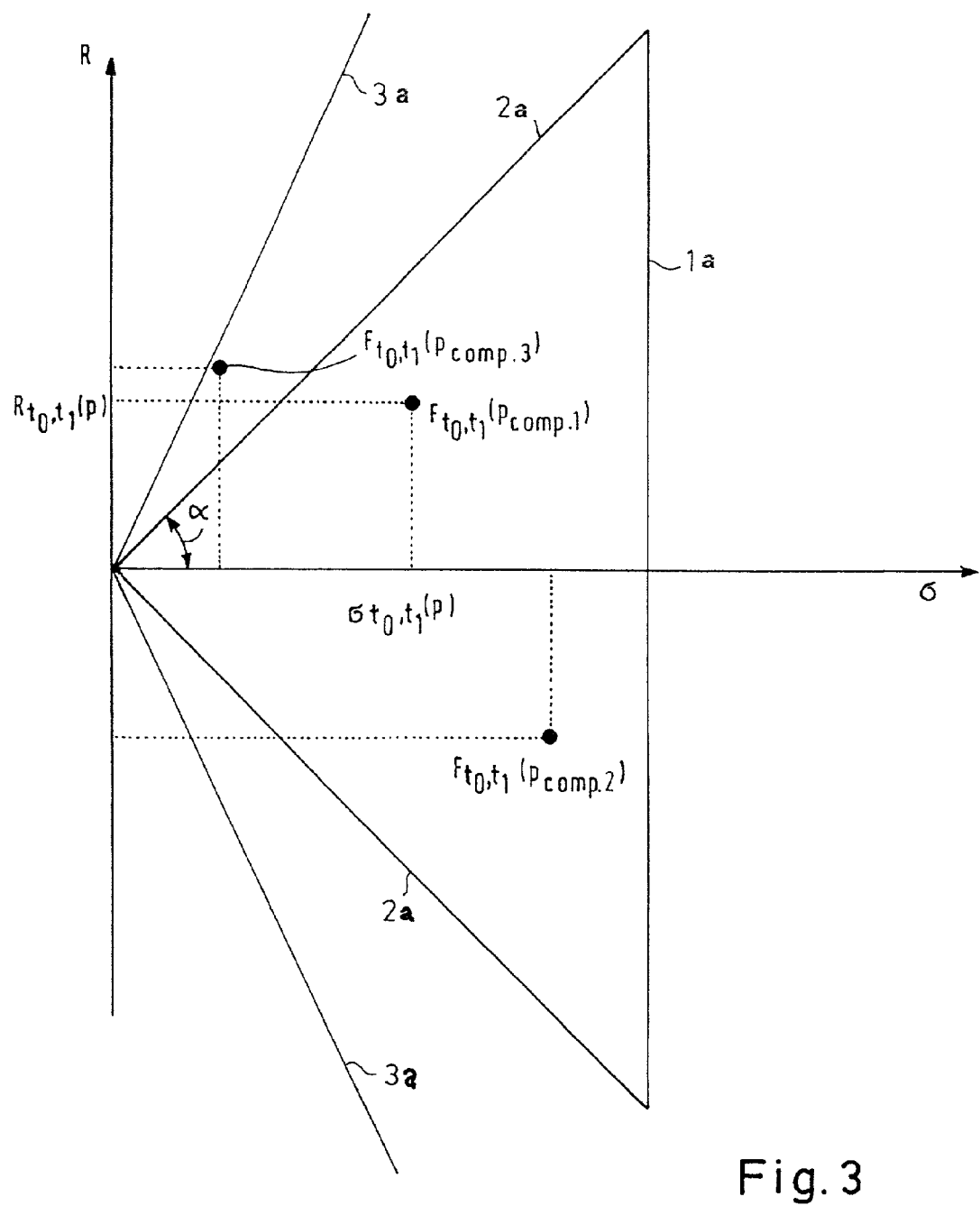
FIG. 3 is an example of a display of a point in the phase space and a sub-space.

FIG. 3 shows an example of a display of the phase space with a corresponding sub-space. The phase space is defined by a coordinate system. The x-axis of the coordinate system is the scaled volatility and the y-axis is the return R. Three arbitrary stocks $p_{company1}$, $p_{company2}$ and $p_{company3}$ are considered in the following.

The time interval for the analysis is the time interval between $t_0$ and $t_1$ for all three stocks (cf. step 2 of FIG. 1). For each of the stocks a corresponding point $F_{t_0,t_1}(p)$ is determined in accordance with the method as explained in detail with respect to FIG. 1.

Each of the respective points $F_{t_0,t_1}(p)$ is displayed in the coordinate system of the phase space. This way the relative performance and the differences in the quality of the stocks being considered become apparent.

In addition a sub-space 1a of the phase space is shown in the coordinate system of FIG. 3. The curve 2a is given by x>|y|, and delimits the sub-space. This curve corresponds to the Gaussian case with respect to the return distributions and to a choice of the probability of a 1-Sigma event (i.e. Prob $(|R_{t_0,t_1}(p)| < \sigma_{t_0,t_1}(p))$) as a probability threshold value which corresponds to a probability of 68,27%.

Hence the probability of one of the points $F_{t_0,t_1}(p)$ to be located within the sub-space 1 is equal to 68,27%.

An additional curve 3a delimits a further sub-space corresponding to a choice of a probability threshold of Prob$(|R_{t_0,t_1}(p)| < 2*\sigma_{t_0,t_1}(p))$ in FIG. 3.

In the case of the stock $p_{company1}$ the corresponding point $F_{t_0,t_1}(p)$ indicates a medium volatility and a return that falls within the expected sub-space 1a. Likewise the corresponding point $F_{t_0,t_1}(p)$ of the stock $p_{company2}$ indicates a high volatility of the stock and a loss and also falls within the expected sub-space 1a.

The corresponding point $F_{t_0,t_1}(p)$ of the stock $p_{company3}$ does not fall within the sub-space 1a. As apparent from FIG. 3 this stock has a low volatility, which usually implies a low likelihood of a large return or loss.

In the time interval between $t_0$ and $t_1$ considered here, the performance of the stock $p_{company3}$ is exceptional as it combines a low volatility with a high return. As a consequence the corresponding point $F_{t_0,t_1}(p)$ of the stock $p_{company3}$ does fall outside the sub-space 1a. In such a situation it can be advisable for an investor to research further information of company3 to find out the cause for the unexpected performance. A typical case can be unexpected high profits, a technological breakthrough and/or a merger or acquisition. For example, it is advantageous to include a gateway functionality to other information, such as charts or news, by using hyperlinks, e.g. by clicking on the points of the phase space.

In essence the visualization in accordance with FIG. 3 enables intuitively comparing the relative performances and quality of a portfolio of stocks over an arbitrarily chosen time frame.

Figure 4:
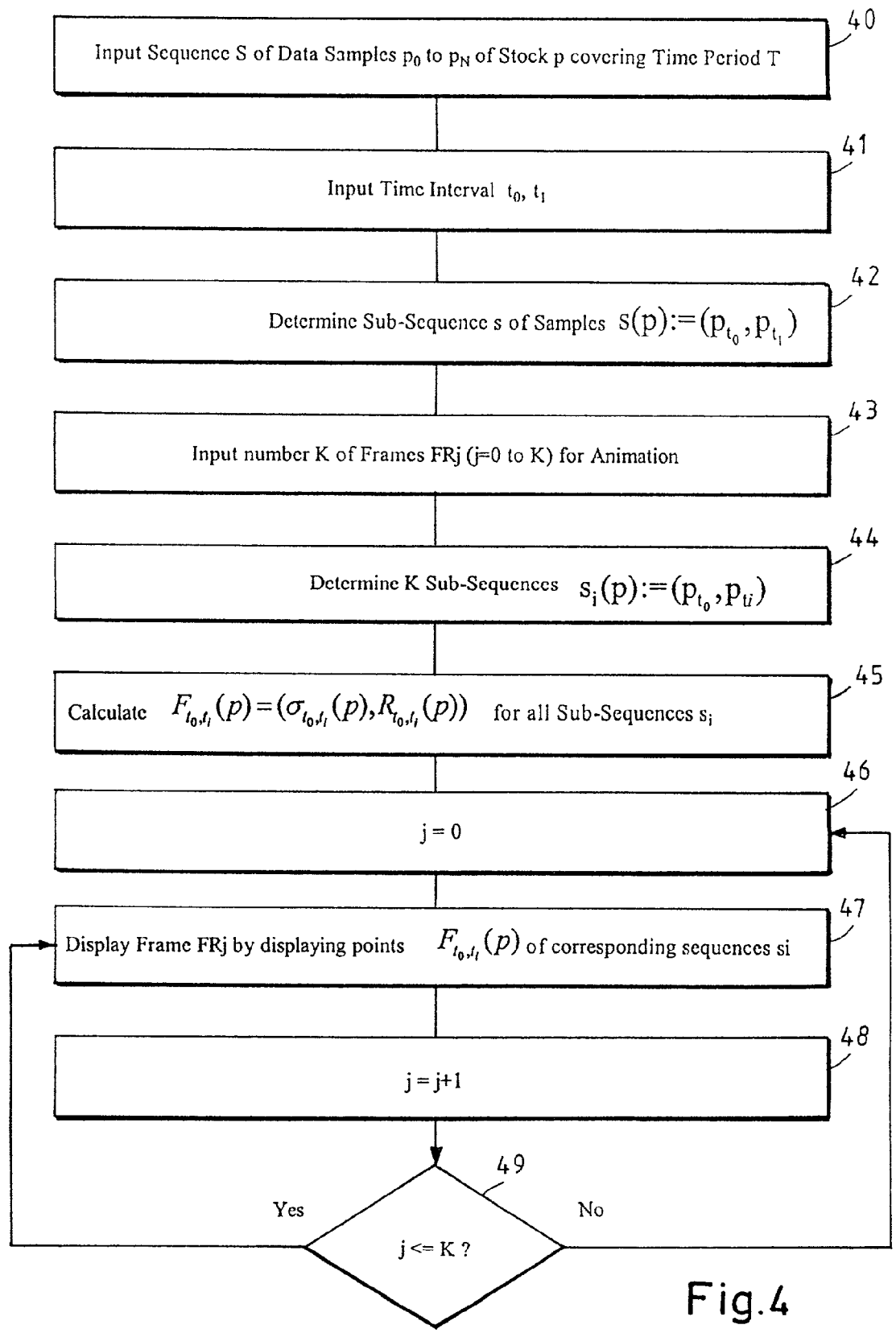
FIG. 4 is a flow chart for determining and displaying of curves in the phase space in an animated mode.

FIG. 4 shows a flow chart for generating an animation to visualize the development of the performance of a stock over the considered time interval.

In step 40 a sequence S of data samples $p_0$ to $p_N$ of a stock p covering a time period T is inputted. In step 41 a time interval $t_0$, $t_1$ for performing the analysis is inputted. In step 42 a corresponding sub-sequence $s(p) := (p_{t_0}, \ldots, p_{t_1})$ is determined. The steps 40, 41 and 42 correspond to the steps 1, 2 and 3 of FIG. 1, respectively.

In step 43 of FIG. 4 a number K is inputted in order to specify the number of the desired video frames $FR_j$ of the animation. For a choice of K, a number K+1 of video frames $FR_0$ to $FR_K$ results.

In step 44 a number K of sub-sequences $s_i(p) := (p_{t_0}, \ldots, p_{t_i})$ is determined. Each sub-sequence $s_{i+1}(p)$ contains all data samples of the sub-sequence $s_i(p)$ and one or more additional data samples.

In step 45 a point $F_{t_0,t_1}(p) = (\sigma_{t_0,t_1}(p), R_{t_0,t_1}(p))$ is calculated for each of the sub-sequences $s_i$ in accordance with the method of FIG. 1.

In step 46 the variable j is initialized to be equal to zero. In step 47 the first frame $FR_0$ is displayed. The first frame $FR_0$ contains all the points $F_{t_0,t_1}(p)$ of the first sub-sequence $s_i$. If more than one entity, such as a stock portfolio, is to be visualized, this is done for each entity such that a separate curve results for each entity.

In step 48 the variable j is increased by one.

In step 49 it is decided whether the variable j is less or equal to the number K of frames. If this is true the control goes back to step 47 in order to display the next consecutive frame FRj until all frames of the animation have been displayed. In this case the variable j will be equal to K such that the control goes from step 49 to step 46 to reinitialize the animation. The last frame $FR_K$ is based on the complete sequence s.

Figure 5:
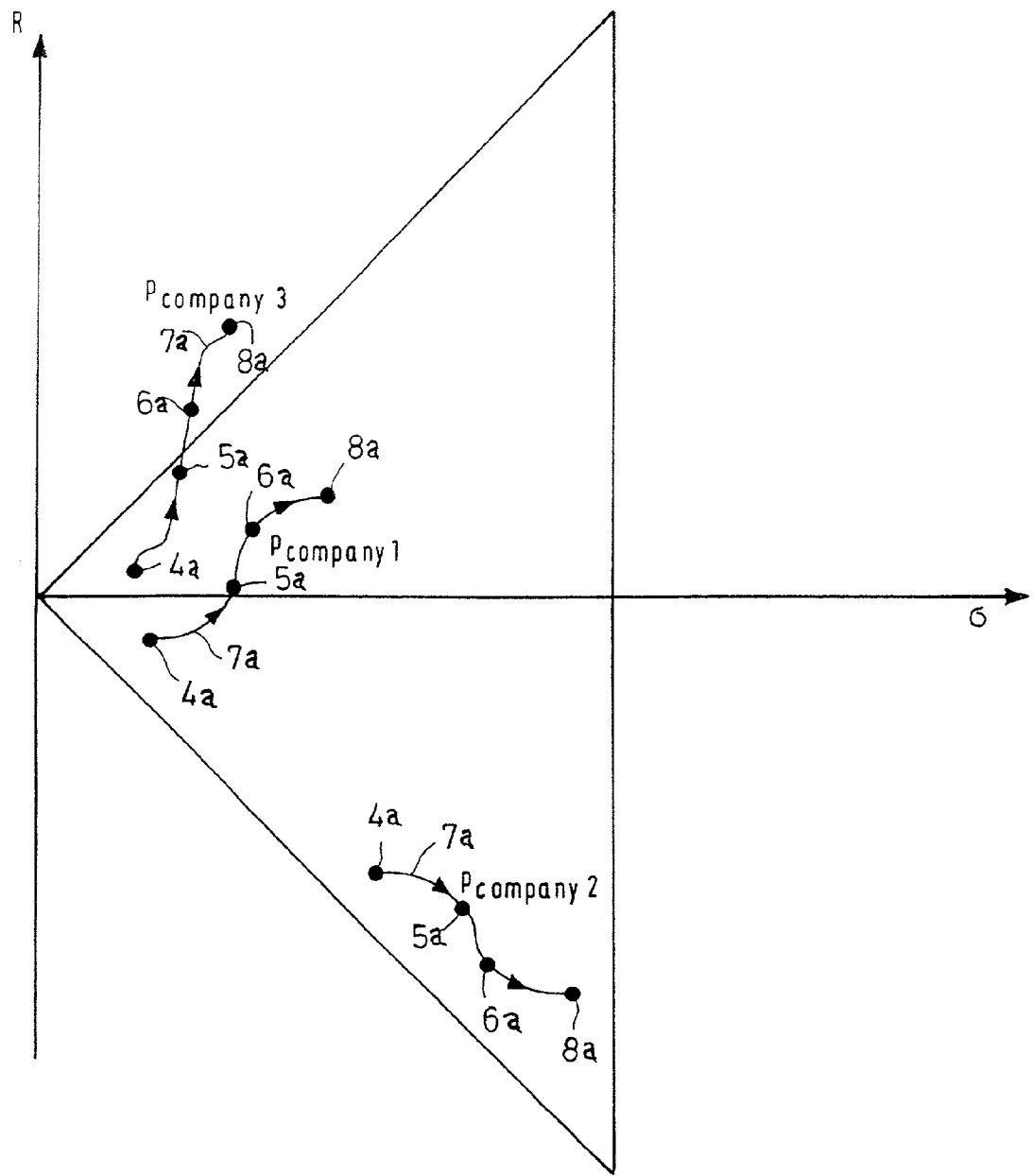
FIG. 5 is an example of a display of a number of curves in the phase space and a sub-space.

FIG. 5 shows an example of the phase space corresponding to the phase space of FIG. 3 with an animation.

For illustrative purposes it is assumed that the animation contains only three video frames. It is apparent that in a practical case the number of video frames can be much higher.

As the number of frames K equals 3, in this case, a corresponding number of 3 sub-sequences $s_i$ are determined for each of the stocks considered here. In the first frame $FR_0$ the points 4a of the respective stocks are shown. The points 4a are computed based on the first sub-sequences $s_0$ of the respective stocks.

Likewise the consecutive frame shows the points 4a and 5a of the respective stocks in the phase space. The additional point 5a is computed based on the second sub-sequences $s_1$ of the respective stocks. In the next frame the three points 4a, 5a and 6a of the respective stocks are displayed; point 6a is based on $S_2$. In the last frame an additional end point 8a is shown which is based on the complete sequence of data samples s.

If a larger number K of frames is selected the individual points 4a, 5a, 6a and 8a of the respective stocks are connected or interpolated by curves 7a; during the animation each of the curves starts at its point 4a and develops over the time of the animation to reach its complete length as shown in FIG. 5.

In a preferred embodiment the visualization of the curve on the display can be trail-like. For example the brightness and/or contrast of points of the curve can be gradually decreased over the time period of one animation cycle such that the decrease is inversely proportional to the index value of the respective points. This way a trail-like visualization of the curve results.

It is a particular advantage that the choice of K ensures the same length of an animation irrespective of the length of the time interval chosen. This is due to the selection of a number K of sub-sequences $s_i$.

Figure 6:
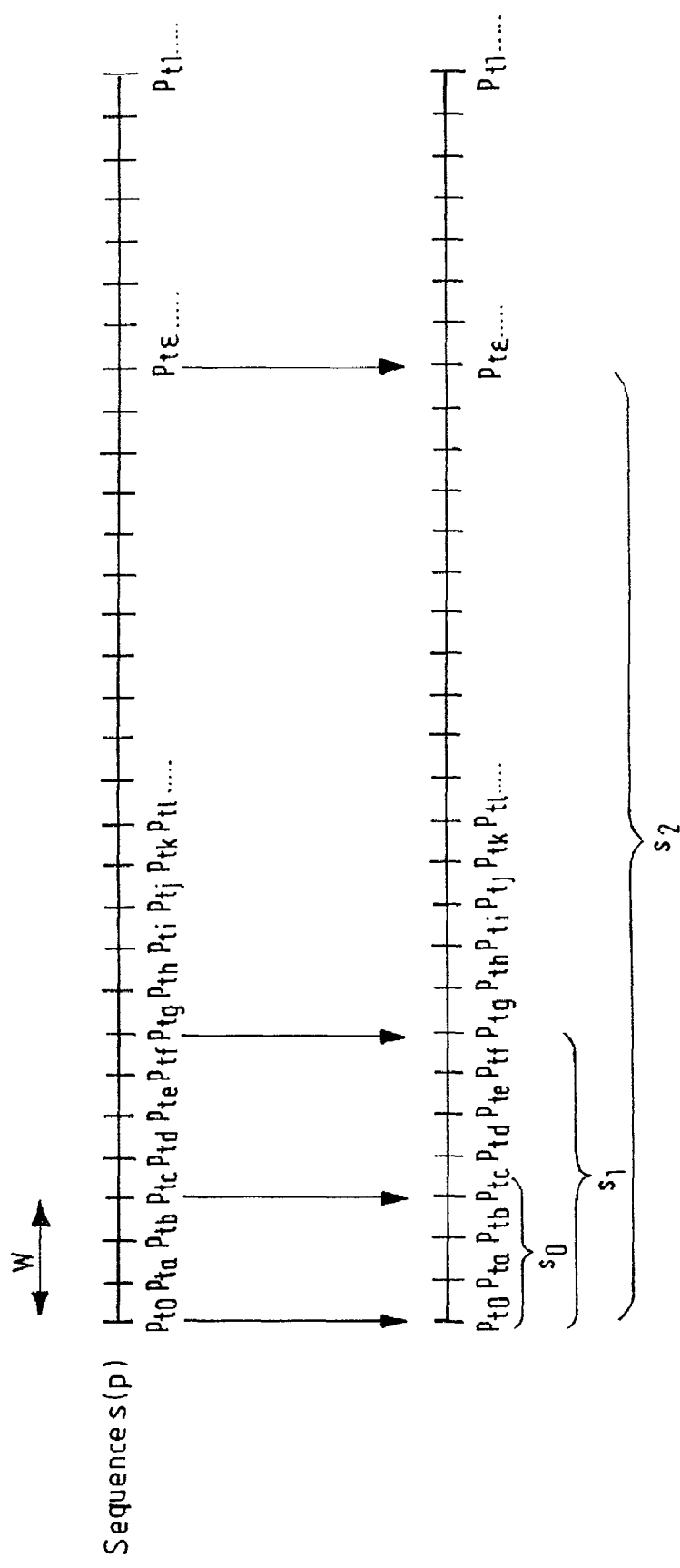
FIG. 6 is a diagram illustrating the mapping of a data sequence to a logarithmic grid.

With respect to FIG. 6 now the determination of the sub-sequences $s_i$ (cf. steps 43 and 44 of FIG. 4 respectively) is explained in more detail by way of example.

The sequence s(p) covers the data samples $p_{t0}$ to $p_{t1}$ of a specific stock as depicted in FIG. 6. In the example considered here K is chosen to be K=3. This results in 3 sub-sequences $s_0$, $s_1$ and $s_2$ as depicted in FIG. 6.

The sub-sequence $s_0$ contains the data samples $p_{t0}$, $p_{ta}$, ..., $p_{tc}$. The next sub-sequence $s_1$ contains the additional data samples $p_{td}$, ..., $p_{tg}$ and the following sub-sequence $s_2$ contains the additional data samples $p_{th}$, ..., $p_{te}$ of the sequence s(p).

The points 4 as depicted in the visualization of FIG. 5 are calculated based on the sequences of data samples $s_0$. Likewise the consecutive points 5a and 6a are calculated based on the sub-sequences $s_1$ and $s_2$. The end point 8a is calculated based on all data samples of the sequence s.

Depending on the nature of the data samples it can be advantageous to define a minimal length W of the first sequence $s_0$. The length W denotes the number of data samples of the first sequence $s_0$. All other sub-sequences have a number of data samples greater than W. In the case of the stock market volatility the initial length W defines an area in the index sequence $p_t$, where no robust volatility estimate can be made.

In a preferred embodiment the sub-sequences are determined based on the following formula:

$$t_1 = t_0 + W \cdot a^K - 1 \quad (8)$$

where a is the step size from one frame to another. This means that the last data sample $p_{t_i}$ of the sequence $s_i(p) := (p_{t_0}, \ldots, p_{t_i})$ is determined by $$t_i = t_0 + W \cdot a^i - 1 \quad (9)$$

The value of a is given by $$a = \sqrt[K]{\frac{t_1 - t_0 + 1}{W}} \quad (10)$$

This is advantageous since the scaling of equation (5) leads to reduced volatility differences for t near $t_1$ as well as because the return scales as the square root of time.

For analysis of an intraday performance of a stock it can be advantageous to use the volatility scaling of the formula or equation (5) with different factors f.

If at least five past price fixings are known, the volatility is estimated based on the last five price fixings as well as the last price fixing at time t of the intraday trading session. In other words, whenever the sequence of historical price fixings is longer than one week, (at least 5 data samples), the daily volatility is calculated based on that period, i.e. based on $\overline{\sigma}_{t_{1-4}, t_1}(p)$, where $t_1$ denotes the last trading day.

At the end of the day the stock p is expected to have the volatility $\overline{\sigma}_{t_{1-4}, t_1}(p)$, whereas at the beginning of the trading day the price differences are less compared to the full trading day.

Therefore, the daily volatility $\overline{\sigma}_{t_{1-4}, t_1}(p)$ is scaled with a factor $T(t_1)$ depending on the last intraday price fixing $t_1$, i.e.

$$\sigma^{I1}(p) = \sqrt{T(t_1) \cdot (\overline{\sigma}_{t_{1-4}, t_1}(p))^2} \quad (11)$$

If the sequence of price fixings consists of less than 5 elements and the last intraday price fixing is later than one hour from the market opening the volatility can be estimated based on the intraday sequence of price fixings. This case is usually present in an initial public offering phase.

A sequence of 5 data samples is taken from the last hour of trading and is used to calculate the volatility estimate in accordance with equation (5). This volatility estimate is denoted $\sigma^{10\,min}$. The final intraday estimate is given by $$\sigma^{I2}(p) = \sqrt{T(t_l) \cdot \frac{t_c - t_0}{t_{10}} \cdot (\sigma^{10\,min}(p, t))^2} \quad (12)$$

where $t_{10}$ is a ten minute time period, $t_c$ is the market closing time and $t_o$ is the time of the market opening, preferably expressed in milliseconds.

Figure 7:
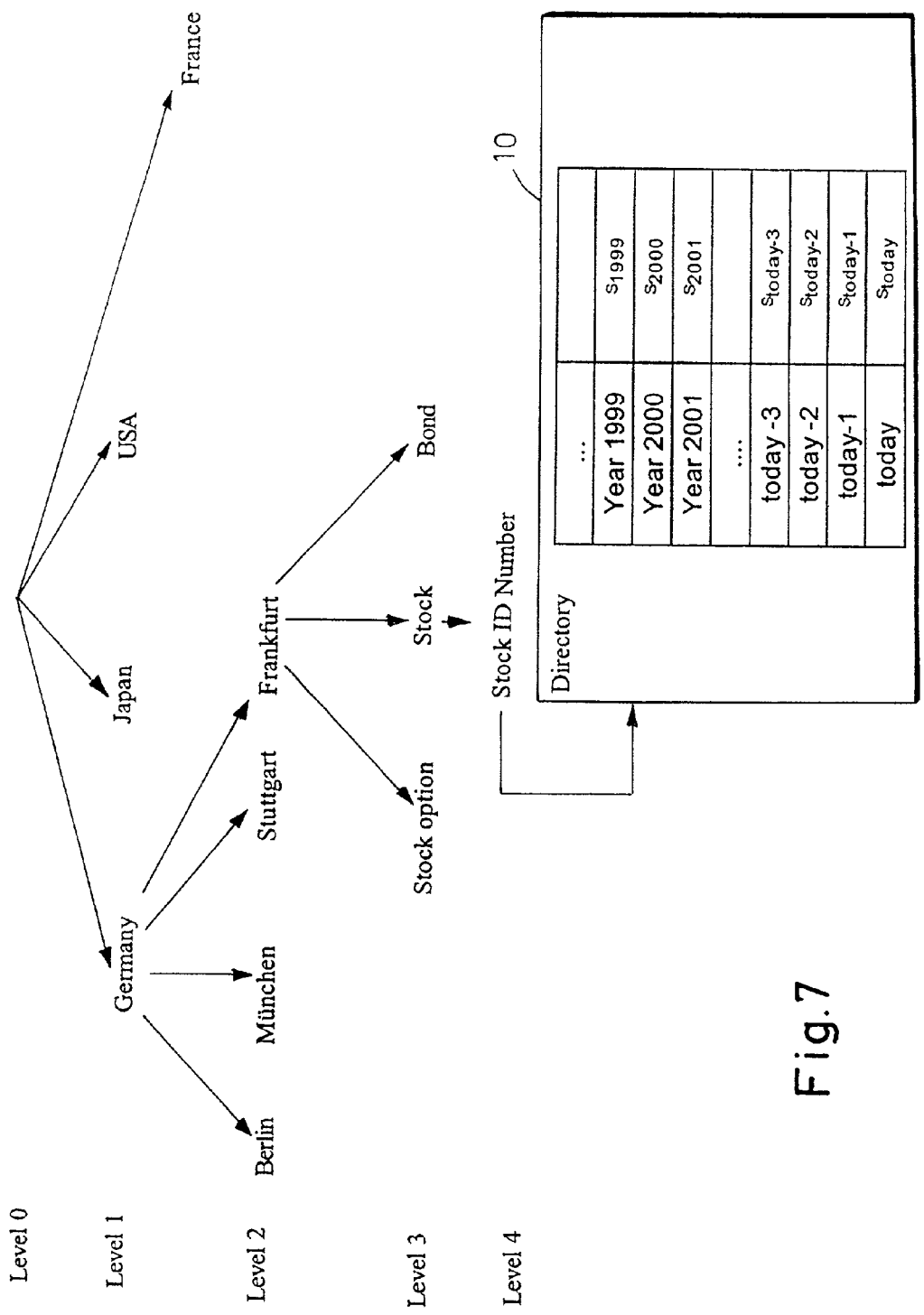
FIG. 7 is a schematic view of a database for storing sequences of stock market data samples.

FIG. 7 shows a database for storing data samples, such as stock market data.

The structure of the database is illustrated by the hierarchical tree structure as depicted in FIG. 7. In the example considered here the tree has five levels of hierarchy, level 0 to level 4. The level 0 is the root of the tree. The level 1 corresponds to a top level geographical indication like countries. The countries contained in level 1 in the example considered here are Germany, Japan, USA and France.

The level 2 of the tree structure corresponds to specific stock market locations within a country, like Berlin, Munich, Stuttgart and Frankfurt in the case of Germany. For the purposes of clarity the corresponding locations for the other countries have been left out of FIG. 7.

The level 3 of the tree structure corresponds to the type of financial instrument or value. In the example considered here the three types are "stock option", "stock" and "bond".

Level 4 is the leaf-level of the tree corresponding to individual financial titles. In the case of stock the level 4 contains the ID number of the stock.

Each element of the leaf-level (level 4) contains a pointer to a directory 10. The directory 10 contains sequences of data samples for different time intervals such as the sequence $S_{1999}$ of settlement prices of the stock with the ID number considered for the year 1999. Likewise the directory 10 contains corresponding sequences of data for the years 2000 and 2001 as well as sequences of intraday price fixings of the last couple of trading days.

The respective sequences are ordered in a time series. Preferably this is accomplished by storing the data samples in the same sequence as they become available and providing the data samples with a time stamp.

Figure 8:
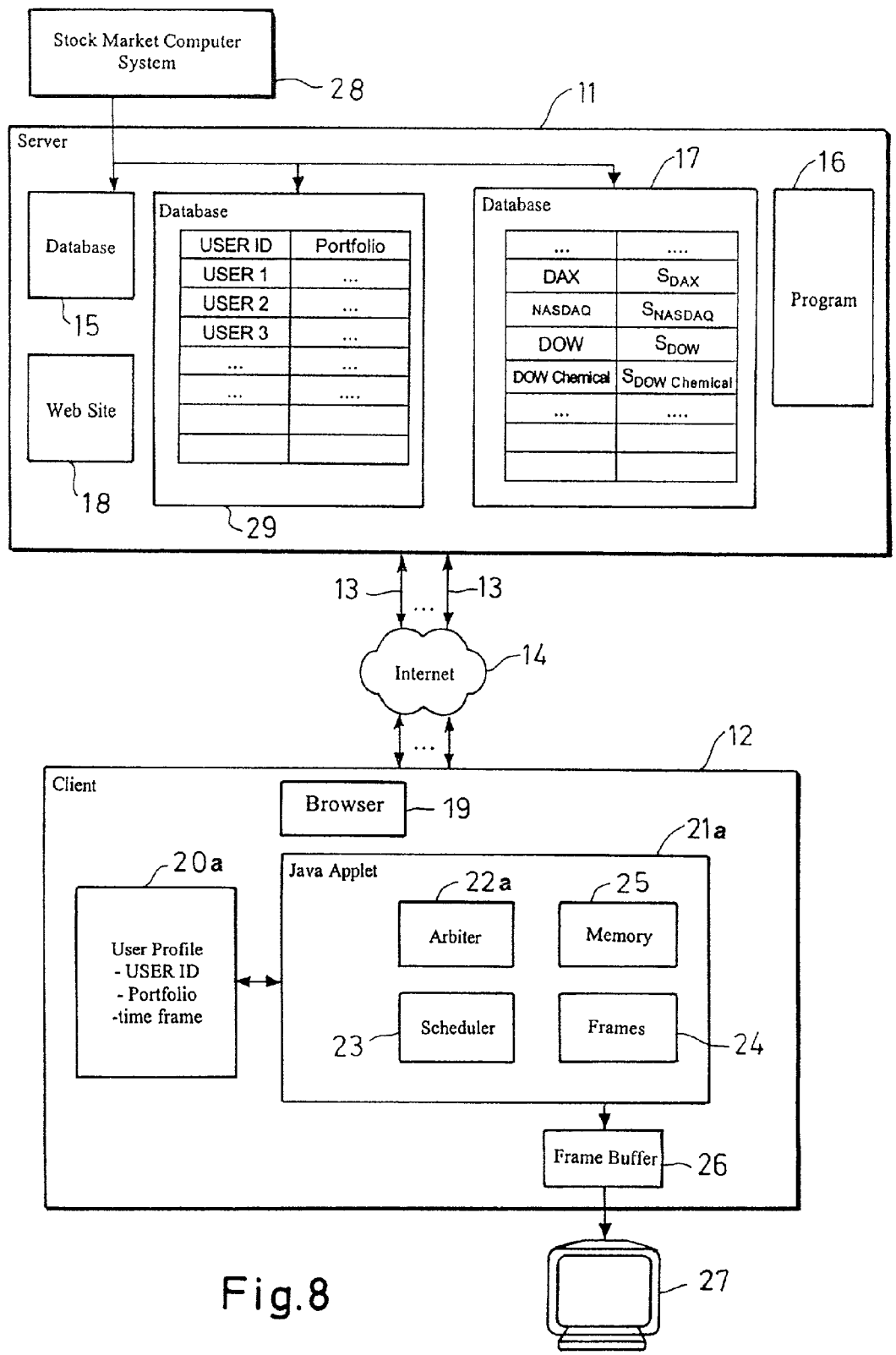
FIG. 8 is a block diagram of an Internet enabled computer system of the invention.

FIG. 8 shows a computer system comprising a server computer 11 and a client computer 12. The server computer 11 and the client computer 12 can be coupled by one or more Internet connections 13 via the Internet 14.

The server computer 11 is coupled to a stock market computer system 28, which provides data samples, such as settlement prices and intraday price fixings from the stock market directly to the server computer 11. Each data sample has a header or index corresponding to the tree structure as depicted in FIG. 7, i.e. an indication of the country and the place of the stock market, the type of the stock, the stock ID number and the corresponding additional data sample of the stock with the ID number with a time stamp. The additional data sample is stored in the corresponding directory 10 (cf. FIG. 7) of database 15 under control of program 16.

Further the server computer 11 has a database 17. The database 17 is redundant to the database 15. It contains compilations of frequently requested sets of data samples of the database 15. For example it can be assumed that a high percentage of users of the financial information system will be interested in the actual development of the most important stock values contained in major stock indices such as the DAX, NASDAQ, DOW, DOW Chemical and others.

Each of these stock indices contains a set of stocks. Each database entry in the database 17 corresponds to such a set of stocks rather than to an individual stock. A database entry of a set of stocks comprises the respective data sequences for each stock in the set of stocks.

For example the stock index DAX contains the set of stocks with the stock IDs: ADS, AFV, BAS, BAY, BMW ..., HVM. The corresponding entry for the DAX in the database 17 thus contains a sequence of data samples for each of the individual stocks contained in the set of stocks of the DAX for the time interval considered, such as the current trading session.

The database 17 can be updated and/or completed instantly, but also when the processing resources required from the server for the processing of user requests is at a minimum, such as outside trading hours or during the night. For example, this enables completing the content of database 17 with sequences of data samples covering historical time intervals.

In addition the server computer 11 has a database 29 for storing of the portfolios of registered users USER1, USER2, USER3, etc. Each user portfolio comprises a sequence of user-defined stocks. When a user connects to the server computer 11 the USER ID serves as a key to retrieve the corresponding user portfolio.

Further the server computer 11 contains a Web site component 18, such as a financial services portal.

The client computer 12 has a Web browser 19. By inputting the uniform resource locator (URL) of the Web site 18 a connection 13 between the client computer 12 and the server computer 11 can be established.

Further the client computer 12 has a cookie 20a for storing a user profile. For example, the user profile can comprise the USER ID and a user defined portfolio of stocks and/or other data indicative of user preferences. Alternatively the information contained in the cookie 20a can also be stored on the server computer 11 after the user logged on.

When the client computer 12 connects to the Web site 18 Java Applet 21a is provided from the server computer 11 to the client computer 12. The Java Applet 21a is started and executed by the client computer 12 upon its receipt. The Java Applet 21a contains an arbiter component 22a, a scheduler 23 and a program component 24 for the determination of video frames.

The Java Applet 21a can access the cookie 20a and the memory 25. Further the Java Applet 21a outputs data from the program component 24 to the frame buffer 26 to which a monitor 27 is connected.

In case the client computer 12 is a mobile phone, a personal digital assistant, a mobile computer or any other computing or telecommunication device having an Internet interface, the monitor 27 will be replaced by a corresponding display.

When the Java Applet 21a is started on client computer 12 it reads information from the cookie 20a that identifies an initial set of stock market data of interest to the user. Additionally, the server can monitor periodical requests of the applet to verify if a user is still requesting data. In the following this is referred to the "live time" of the client process.

For example the user can specify that the intraday data samples of the DAX are to be downloaded when an initial connection is made to the server computer 11. In this case the Java Applet 21a accesses the database 17 to obtain the intraday set of data samples of the DAX. The corresponding database entry can be streamed to the client computer 12 and stored in the memory 25. It is to be noted that this operation can be performed with a minimal latency time as no further database queries are required.

Based on the data samples stored in the memory 25 the Java Applet 21a computes a visualization corresponding to the display format of FIG. 3 and/or FIG. 5. If the animation mode (cf. FIG. 5) is selected this requires the determination of a number K of frames. The frames are computed by the program component 24 and stored in the frame buffer 26 for display by the monitor 27.

If the monitoring of the lifetime of the client process fails, e.g. the client has interrupted the transmission, the corresponding set of data samples can not be obtained by streaming the data samples from the database 17. Instead the required sequences of data samples first need to be retrieved from the database 15.

This is accomplished by the Java Applet 21a by opening a plurality of connections 13, for example ten connections 13. Correspondingly, 10 database queries can be done in parallel. The arbiter 22 assigns individual requests for database queries to one of the available connections 13. Again the corresponding set of data samples that result from the query of the database 15 is stored in the memory 25. Based on the set of data the Java Applet 21a again calculates a visualization corresponding to the display format of FIG. 3 and/or FIG. 5.

The scheduler 23 of the Java Applet 21a serves to regularly update the sets of data samples contained in the memory 25. This is done by querying the server computer 11 for additional data samples at regular time intervals. This can be done based on the time stamp of the last data sample in a specific sequence. Alternatively updated data can also be obtained by a PUSH operation of the server computer 11.

All data samples in the corresponding sequences of data samples of database 15 and/or 17 with a greater time stamp will be downloaded to the client computer 12 in response to such a query. This avoids download of the complete set of data samples for each update request.

In order to minimize the overall server requests the database 29 can be used. When a user connects to the server computer 11, the user is identified by the USER ID stored in the cookie 20a, which is read automatically and provided to the server computer 11 by the Java Applet 21a. Alternatively the user can be prompted to input the USER ID and password manually for authentification purposes.

The USER ID is used as a key by the program 16 to access the corresponding user defined portfolio of stocks. The program 16 performs a query of database 15 in order to collect the required sequences of data samples for a specific time frame. The time frame can be manually inputted by the user or it can be predefined or contained as an additional data item in the cookie 20a.

Once all required sequences of data samples have been retrieved the whole set of data samples is transmitted from the server computer 11 to the client computer 12 in "one shot", for example by a PUSH of the server computer 11. This way multiple connects 13 and multiple client requests for querying the database 15 can be avoided.

The sequences of data samples retrieved for the user are updated at regular time intervals by a background server process performed by the program 16. Any additional data which become available are provided to the user immediately or with a predefined delay.

The connection 13 is monitored by the server computer 11 for http requests of the user. When the user has not made a request for a certain time interval the background server process is stopped. A renewed user request can restart the background server process.

Figure 9:
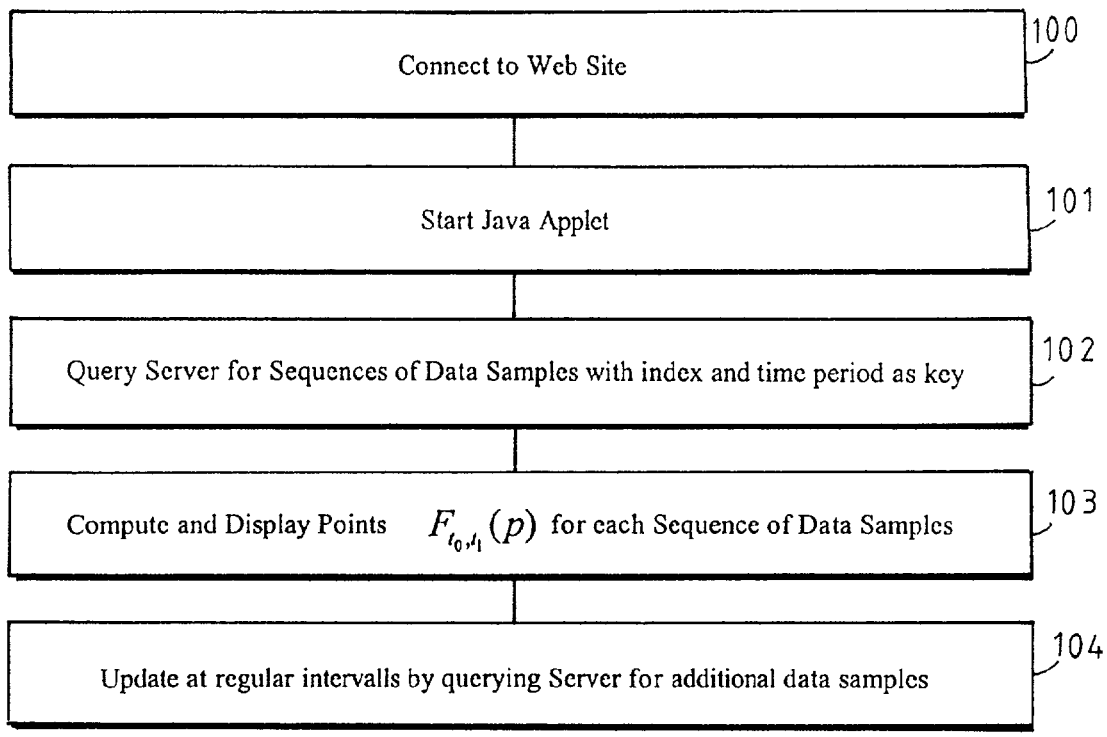
FIG. 9 is a flow chart illustrating the operation of the computer system of FIG. 8.

FIG. 9 shows a flow chart of the steps performed by the client computer 12.

In step 100 the client computer connects to the Web site by inputting the URL of the Web site into its browser. In response to this the Java Applet is provided to the client computer and started automatically in step 101.

The Java Applet queries the server computer 11 for sequences of data samples with an index and a time period as keys corresponding to the database structure as depicted in FIG. 7. For example the Java Applet can query the server to obtain the intraday data samples of the DAX stocks as a default.

Based on such sequences of data samples provided by the server computer points $F_{t_0,t_1}(p)$ are computed for each sequence of the downloaded data samples and displayed in step 103. The corresponding display is updated at regular time intervals, such as 30 seconds, by querying the server computer for additional data samples in step 104.

Figure 10:
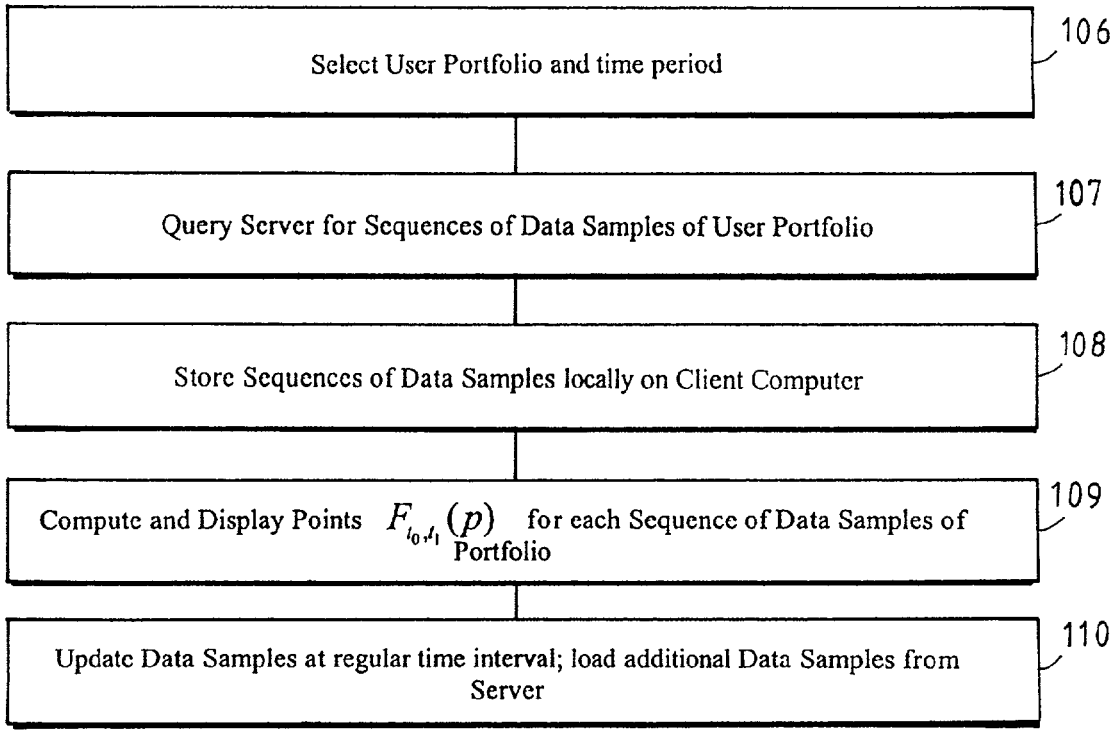
FIG. 10 is a flow chart illustrating the operation of the computer system of FIG. 8 in another mode.

FIG. 10 shows an alternative mode of operation. In step 106 the user selects a user-defined portfolio of stocks or stock values and a specific time period for the analysis. In step 107 the server computer is queried to obtain the corresponding sequences of data samples. The sequences of data samples are stored locally on the client computer in step 108. The corresponding points $F_{t_0,t_1}(p)$ for each sequence of data samples are computed and displayed in step 109. Again the corresponding display is updated at regular time intervals by loading additional data samples from the server.

Although the present invention has been shown and described with respect to preferred embodiments, nevertheless, changes and modifications will be evident to those skilled in the art from the teachings of the invention. Such changes and modifications that embody the spirit, scope and teachings of the invention are deemed to fall within the purview of the invention as set forth in the appended claims.

| List of reference numerals | |
|---|---|
| Sub space | 1a |
| Curve | 2a |
| Curve | 3a |
| Point | 4a |
| Point | 5a |
| Point | 6a |
| Curve | 7a |
| Point | 8a |
| Directory | 10 |
| Server computer | 11 |
| Client computer | 12 |
| Connections | 13 |
| Internet | 14 |
| Database | 15 |
| Program | 16 |
| Database | 17 |
| Web site | 18 |
| Browser | 19 |

| -continued | |
|---|---|
| List of reference numerals | |
| Cookie | 20a |
| Java Applet | 21a |
| Arbiter | 22a |
| Scheduler | 23 |
| Program component | 24 |
| Memory | 25 |
| Frame buffer | 26 |
| Monitor | 27 |
| Stock market computer system | 28 |
| Database | 29 |

What is claimed is:

1. A computer implemented method for displaying volatility between a successive sequence of data samples in a set of data samples, the method comprising:

selecting, from data inputted into at least one computer, at least one data pertaining to members of the group consisting of: stocks, stock options, bonds, currency exchange rates, microeconomic values, macroeconomic values, stock exchanges, personal stock portfolios, turnover, return on net asset, inflation rate, unemployment, sports, science, opinion polls, sports team performance, technology, physical experiments, and sociology, a successive sub-sequence s(p) of data samples for analysis in a set S of data samples s(p):=(pt0, . . . , pt1);

calculating, using the at least one computer, a standard deviation $\overline{\sigma_{t_0,t_1}(p)}$ of the sub-sequence s(p) of data samples to derive an unscaled volatility thereof;

scaling, using the at least one computer, with a scale factor f the standard deviation $\overline{\sigma_{t_0,t_1}(p)}$ of the sub-sequence s(p) of data samples to derive a scaled volatility of the sub-sequence s(p) of data samples $\overline{\sigma_{t_0,t_1}(p)}\cdot f$, the scale factor f being dependent on a length of the sub-sequence s(p);

calculating, using the at least one computer, a net change in value $R_{t,t+1}(p)$ between each set of successive data samples within the sub-sequence s(p) of data samples;

mapping, using the at least one computer, to a Cartesian coordinate system with a first axis representing the net change in value between each set of successive data samples within the sub-sequence s(p) of data samples $R_{t,t+1}(p)$ and a second axis representing the scaled volatility of the sub-sequence s(p) of data samples $\overline{\sigma_{t_0,t_1}(p)}\cdot f$;

calculating, using the at least one computer, a probability distribution of the net change;

determining, using the at least one computer, a probability threshold value; and determining, using the at least one computer, a region within the Cartesian coordinate system associated with the probability distribution and the probability threshold value; and outputting, using the at least one computer, to a display on the Cartesian coordinate system the net change in value, within the determined region, between each set of successive data samples within the sub-sequence s(p) of data samples $R_{t,t+1}(p)$ in relation to the scaled volatility of the sub-sequence s(p) of data samples $\overline{\sigma_{t_0,t_1}(p)}\cdot f$ to indicate to a user the scaled volatility between each set of successive data samples within the sub-sequence s(p) of data samples.

2. The computer implemented method of claim 1, wherein the factor f, related to the square root of the length of the sequence, is given by $f=\sqrt{(t_1-t_0)}$, where $t_0$ and $t_1$ define the start time and the end time of a time interval of the sub-sequence of data samples, respectively.

3. The computer implemented method of claim 1, wherein said data input further includes a dimension selected from the group consisting of: time, length, energy, and speed.

4. The computer implemented method of claim 1, wherein the probability distribution is a Gaussian distribution.

5. The computer implemented method of claim 1, wherein the probability threshold value is equal to one of the standard deviation and the standard deviation times an integer value.

6. The computer implemented method of claim 1, wherein the region has the form of one of a cone or the projection of a cone.

7. The computer implemented method of claim 1, wherein each of the data samples are correlated to a price value, and the net change is correlated to a return.

8. The computer implemented method of claim 1, wherein data pertaining to price is selected, and each data sample is a price fixing within an intraday time period.

9. The computer implemented method of claim 1, further comprising displaying a boundary of the region within the Cartesian coordinate system.

10. The computer implemented method of claim 1, further comprising displaying a number of K frames FRj, each of the frames FRj visualizing one of a corresponding set of points p0 to pi and a sub-set of the set of points.

11. The computer implemented method of claim 1, further comprising decreasing the brightness and/or contrast of a set of points displayed on the first axis and the second axis, wherein the set of points indicate the net change in value between each set of successive data samples.

12. The computer implemented method of claim 1, wherein the first sub-sequence selected, of the successive sub-sequences, covers an intraday period.

13. The computer implemented method of claim 1, further comprising:
  defining a hierarchical tree structure, the tree structure providing an index structure for accessing a database;
  providing a plurality of sequences each composed of data samples, and
  storing said plurality of sequences of data samples, the data samples being ordered in a time series, and each of the sequences being associated with a leaf of the hierarchical tree structure.

14. The computer implemented method of claim 13, wherein the database contains a plurality of files, each file storing a predefined set of sequences, with the set of sequences stored in each file being associated with a specific distinct entity and being accessible by an identifier of the specific distinct entity.

15. The computer implemented method of claim 14, wherein the specific distinct entity is a predetermined group of stock values, a stock portfolio, or a stock or other financial index.

16. The computer implemented method of claim 13, further comprising:
  storing a number of user defined portfolios which are retrievable by a key;
  retrieving sequences of data samples corresponding to a user defined portfolio, upon a user request, by querying the database;
  providing the user with the sequences of data samples;
  updating the sequences of data samples at regular time intervals; and
  discontinuing the updating process when a user has failed to perform an action during a predefined time interval.

17. The computer implemented method of claim 1, wherein the mapping step is further adapted to determine a region within the Cartesian coordinate system in which a point is situated with a probability being equal to a predetermined probability value, the determination of the sub-space being made responsive to the predetermined probability value and a probability distribution.

18. The computer implemented method of claim 1, wherein the mapping further includes mapping to the Cartesian coordinate system with the first axis representing the net change in value between each set of successive data samples within the sub-sequence s(p) of data samples $R_{t,t+1}(p)$ and the second axis representing the scaled volatility of the sub-sequence s(p) of data samples $\overline{\sigma_{t_0,t_1}(p)} \cdot f$ using a logarithmic grid.

19. The computer implemented method of claim 1, wherein the regions are displayed in the Cartesian coordinate system as a line.

20. A computer program product for displaying volatility between a successive sequence of data samples in a set of data samples, the computer program product comprising instructions which perform the following functions when executed on at least one computer:
  selecting, from data inputted into the at least one computer, at least one data pertaining to members of the group consisting of: stocks, stock options, bonds, currency exchange rates, microeconomic values, macroeconomic values, stock exchanges, personal stock portfolios, turnover, return on net asset, inflation rate, unemployment, sports, science, opinion polls, sports team performance, technology, physical experiments, and sociology, a successive sub-sequence s(p) of data samples for analysis in a set S of data samples s(p):=(pt0, ..., pt1);
  calculating, using the at least one computer, a standard deviation $\overline{\sigma_{t_0,t_1}(p)}$ of the sub-sequence s(p) of data samples to derive an unscaled volatility thereof;
  scaling, using the at least one computer, with a scale factor f the standard deviation $\overline{\sigma_{t_0,t_1}(p)}$ of the sub-sequence s(p) of data samples to derive a scaled volatility of the sub-sequence s(p) of data samples $\overline{\sigma_{t_0,t_1}(p)} \cdot f$, the scale factor f being dependent on a length of the sub-sequence s(p);
  calculating, using the at least one computer, a net change in value $R_{t,t+1}(p)$ between each set of successive data samples within the sub-sequence s(p) of data samples;
  mapping, using the at least one computer, to a Cartesian coordinate system with a first axis representing the net change in value between each set of successive data samples within the sub-sequence s(p) of data samples $R_{t,t+1}(p)$ and a second axis representing the scaled volatility of the sub-sequence s(p) of data samples $\overline{\sigma_{t_0,t_1}(p)} \cdot f$;
  calculating, using the at least one computer, a probability distribution of the net change;
  determining, using the at least one computer, a probability threshold value; and
  determining, using the at least one computer, a region within the Cartesian coordinate system associated with the probability distribution and the probability threshold value; and
  outputting, using the at least one computer, to a display on the Cartesian coordinate system the net change in value, within the determined region, between each set of successive data samples within the sub-sequence s(p) of data samples $R_{t,t+1}(p)$ in relation to the scaled volatility of the sub-sequence s(p) of data samples $\overline{\sigma_{t_0,t_1}(p)} \cdot f$ to indicate to a user the scaled volatility between each set of successive data samples within the sub-sequence s(p) of data samples.

* * * * *